US009202472B1

(12) United States Patent
Sharifi et al.

(10) Patent No.: US 9,202,472 B1
(45) Date of Patent: Dec. 1, 2015

(54) MAGNITUDE RATIO DESCRIPTORS FOR PITCH-RESISTANT AUDIO MATCHING

(75) Inventors: Matthew Sharifi, Zurich (CH); Dominik Roblek, Mountain View, CA (US); George Tzanetakis, Victoria (CA)

(73) Assignee: Google Inc., Mountain View, CA (US)

( * ) Notice: Subject to any disclaimer, the term of this patent is extended or adjusted under 35 U.S.C. 154(b) by 903 days.

(21) Appl. No.: 13/434,832

(22) Filed: Mar. 29, 2012

(51) Int. Cl.
*G06F 17/30* (2006.01)
*G10L 19/018* (2013.01)

(52) U.S. Cl.
CPC .................................... *G10L 19/018* (2013.01)

(58) Field of Classification Search
CPC .................... G06F 17/30743; G06F 17/30758; H04H 60/58; H04H 60/37; H04H 2201/90
See application file for complete search history.

(56) References Cited

U.S. PATENT DOCUMENTS

2002/0083060 A1* 6/2002 Wang et al. ..................... 707/10
2007/0143108 A1* 6/2007 Kurozumi et al. ............ 704/239

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/ VideoFingerprinting_SPIE-MFS09.pdf, Last accessed May 30, 2012.
Chandrasekhar, et al., "Survey and Evaluation of Audio Fingerprinting Schemes for Mobile Query-By-Example Applications," 12th International Society for Music Information Retrieval Conference, 2011, 6 pages.

* cited by examiner

*Primary Examiner* — Curtis Kuntz
*Assistant Examiner* — Thomas Maung
(74) *Attorney, Agent, or Firm* — Fenwick & West LLP

(57) ABSTRACT

Systems and methods for generating unique pitch-resistant descriptors for audio clips are provided. In one or more embodiments, a descriptor for an audio clip is generated as a function of relative magnitudes between interest points within the audio clip's time-frequency representation. A number of techniques for leveraging the relative magnitudes to generate descriptors are considered. These techniques include ordering of interest points as a function of ascending or descending magnitude, creation of binary vectors based on magnitude comparisons between pairs of points, and calculation of quantized magnitude ratios between pairs of points. Descriptors generated based on relative magnitudes according to the techniques disclosed herein are relatively invariant to common transformations to the original audio clip, such as pitch shifting, time stretching, global volume changes, equalization, and/or dynamic range compression.

18 Claims, 13 Drawing Sheets

MAGNITUDE RATIO DESCRIPTORS FOR PITCH-RESISTANT AUDIO MATCHING

TECHNICAL FIELD

This disclosure generally relates to generation of audio clip descriptors that are substantially resistant to pitch shifting.

BACKGROUND

Digitization of music and other types of audio information has given rise to digital storage libraries that serve as searchable repositories for music files and other audio clips. In some scenarios, a user may wish to search such repositories to locate a high quality or original version of an audio clip corresponding to a low quality or second-hand recorded clip. In an example scenario, upon hearing a song of interest being played in a public location (e.g., over a speaker system at a bar or shopping center), a user may record the song using a portable recording device, such as a mobile phone with recording capabilities or other such recording device. Since the resultant recording may include ambient noise as well as the desired song, the user may wish to locate a higher quality original version of the song. In another example, a user may record a song clip from a radio broadcast, and attempt to locate an official release version of the song by searching an online music repository.

Audio matching is a technique for locating a stored audio file corresponding to an audio clip (referred to herein as a probe audio clip) provided by a user. This technique for locating audio files can be particularly useful if the user has no searchable information about the audio file other than the audio clip itself (e.g., if the user is unfamiliar with a recorded song). To determine whether a stored audio file matches a probe audio clip provided by a user, an audio matching system can extract audio characteristics of the probe audio clip and match these extracted characteristics with corresponding characteristics of the stored audio file.

However, if the audio characteristics of the probe audio clip have been subjected to pitch shifting, time stretching, and/or other such transformations, audio matching between the probe audio clip and the corresponding stored audio file may not be reliable or accurate, since the audio characteristics of the transformed probe clip may no longer match those of the stored audio file. For example, a song recorded using a portable recording device in proximity of a speaker source may undergo a global volume change depending on the distance of the recording device from the audio source at the time of the recording. Moreover, audio information broadcast over the radio is sometimes subjected to pitch shifting, time stretching, and/or other such audio transformations, and therefore possesses modified audio characteristics relative to the originally recorded information. Such common transformations can reduce the effectiveness of audio matching when attempting to match a stored audio file with a probe audio clip, since the modified characteristics of the probe audio clip may yield a different descriptor than that of the stored audio data.

The above is merely intended to provide an overview of some of the challenges facing conventional systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented in this disclosure.

One or more embodiments disclosed herein relate to generation of substantially pitch-resistant audio file descriptors suitable for audio matching. A descriptor generation component can generate the descriptors based on characteristics of the audio file's time-frequency spectrogram that are relatively stable and invariant to pitch shifting, time stretching, and/or other such common transformations. To this end, a point detection component can select a set of interest points within the audio file's time-frequency representation, and group the set of interest points into subsets. For each subset of interest points, a descriptor extraction component can use the relative magnitudes between the interest points to generate a descriptor for the subset. The descriptors generated for the respective subsets of interest points in this manner can together make up a composite identifier for the audio clip that is discriminative as well as invariant to pitch shifting and/or other such audio transformations. A number of techniques for using these relative magnitudes are described herein.

According to one or more embodiments, the descriptor extraction component can generate the descriptors based on magnitude ordering. In such embodiments, the descriptor generation component can order selected interest points of an audio clip's time-frequency representation according to ascending or descending magnitude. An encoder can then generate a descriptor based on this ordering.

In another implementation, the descriptor extraction component can designate one of the interest points as an anchor point to be compared with other interest points in the subset. According to this implementation, the point detection component can select a subset of interest points from an audio clip's time-frequency representation and designate one of the interest points to act as an anchor point for the subset. A compare component can calculate a set of binary comparison vectors and/or a set of magnitude ratios based on the relative magnitudes between the anchor point and each of the remaining interest points in the subset. An encoder can then encode these binary vectors and/or magnitude ratios in a descriptor associated with the subset of interest points. The encoder may also combine this descriptor with descriptors derived in a similar manner for other subsets of interest points within the audio clip to create a composite identifier that uniquely identifies the audio clip. In certain embodiments, the magnitude ratio information can also be added to other descriptive information about the audio file's local characteristics, such as information regarding interest point position, to yield a unique descriptor. In one or more embodiments, a quantize component can quantize the magnitude ratios into suitably sized bins prior to encoding.

In one or more embodiments, the techniques for generating an audio clip descriptor described in this disclosure can use normalized magnitude values rather than raw magnitude values. To derive these normalized values (referred to herein as strength values), a normalize component can calculate, for each interest point, a mean magnitude across a time-frequency window substantially centered at the interest point. Use of these strength valves instead of the raw magnitude values can render the resulting descriptors more resistant to equalization and dynamic range compression.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
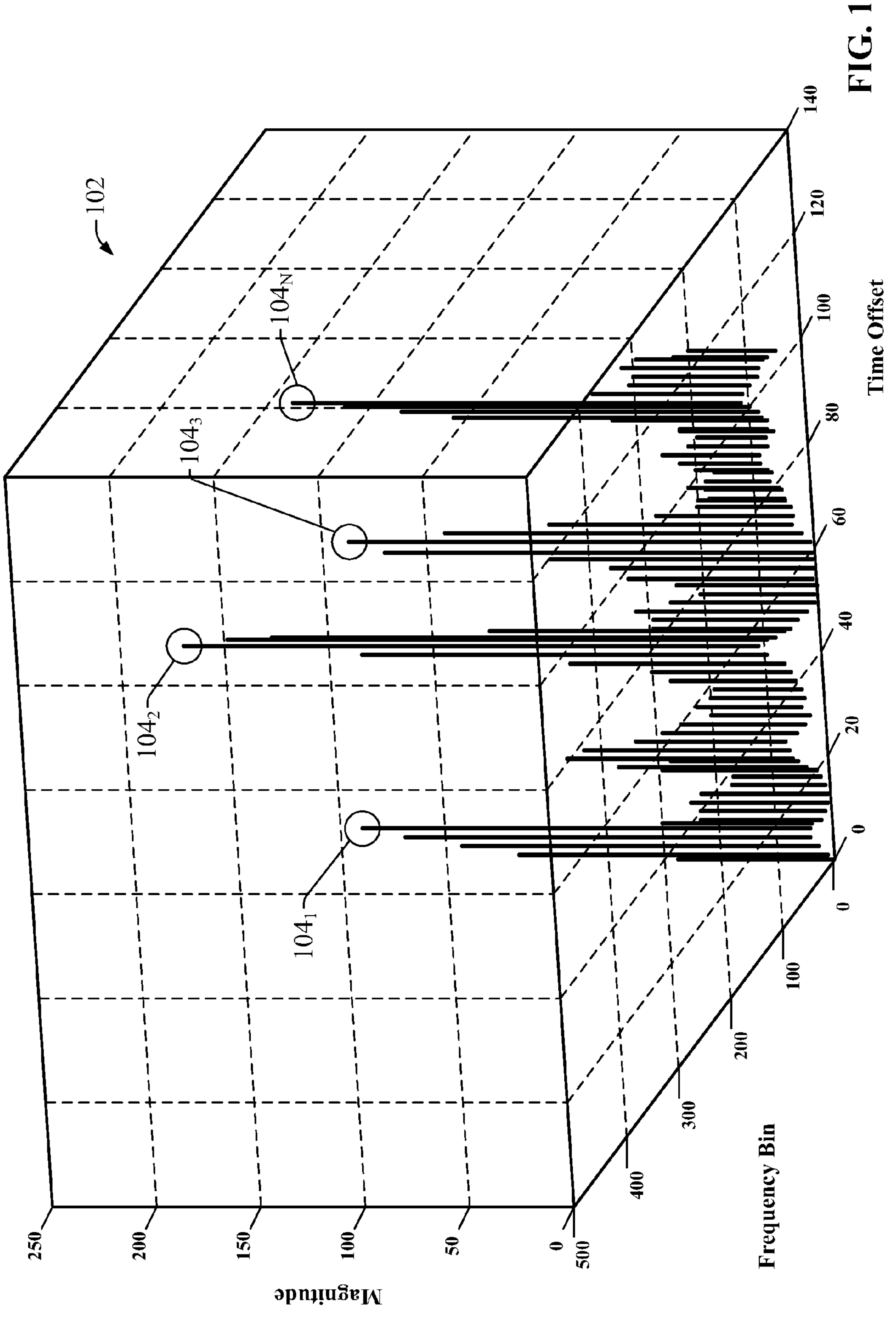
FIG. 1 illustrates an exemplary time-frequency spectrogram for an audio signal.

Various embodiments are now described with reference to the drawings, wherein like reference numerals refer to like elements throughout. In this specification, numerous specific details are set forth in order to provide an understanding of this disclosure. However, such embodiments may be practiced without these specific details, or with other methods, components, materials, etc. In other instances, structures and devices are shown in block diagram form to facilitate describing one or more embodiments.

Systems and methods described herein relate to generation of audio descriptors that are substantially resistant to pitch shifting, time stretching, and/or other audio transformations or distortions. An audio descriptor can characterize local content of an audio clip. In some implementations, such audio descriptors can be extracted from a probe audio clip (e.g., an audio clip provided by a user) and submitted as a search criterion to a repository of stored audio files. A stored audio file matching the probe audio sample can be identified by matching a set of audio descriptors extracted from the probe audio clip with a set of audio descriptors of the stored audio file. To ensure accurate and reliable descriptor matching, the audio descriptors should be generated in a manner that is largely resistant to noise, pitch shifting, time stretching, noise, and/or other such audio transformations. Accordingly, one or more embodiments described herein provide calculation techniques that yield repeatable, consistent descriptors for a given audio clip even if the clip has been subjected to pitch shifting, time stretching, and/or other audio distortions.

Descriptors can be generated as a function of information contained in the audio clip's time-frequency spectrogram. FIG. 1 illustrates an exemplary non-limiting time-frequency spectrogram 102 for an audio clip. Time-frequency spectrogram 102 is a three-dimensional time-frequency representation of the audio signal plotted in terms of time, frequency, and magnitude. Time-frequency spectrogram 102 plots the frequencies present in the audio clip for a range of times, as well as the magnitude of the frequencies at the respective times (where the magnitude is a measure of the amount of a given frequency at a given time). For clarity, time-frequency spectrogram 102 is a simplified spectrogram depicting only a single frequency for each point in time. However, it is to be understood that the techniques described in this disclosure are suitable for use with audio signals having spectrograms of any frequency density.

A set of descriptors for the audio clip can be generated as a function of selected interest points of the time-frequency spectrogram 102, such as interest points $\mathbf{104}_{1\text{-}N}$. Each interest point of interest points $\mathbf{104}_{1\text{-}N}$ is a point on the time-frequency plane of the time-frequency spectrogram 102, and has an associated magnitude dimension. Since the magnitude component of an audio clip's spectrogram is relatively invariant to pitch shifting and time stretching compared with the time and frequency components, the systems and methods described herein leverage the magnitude components of the selected interest points to create a set of descriptors that uniquely identify the audio clip. The magnitude information can be manipulated in a number of different ways to yield suitable descriptors, as will be explained in more detail below.

Figure 2:
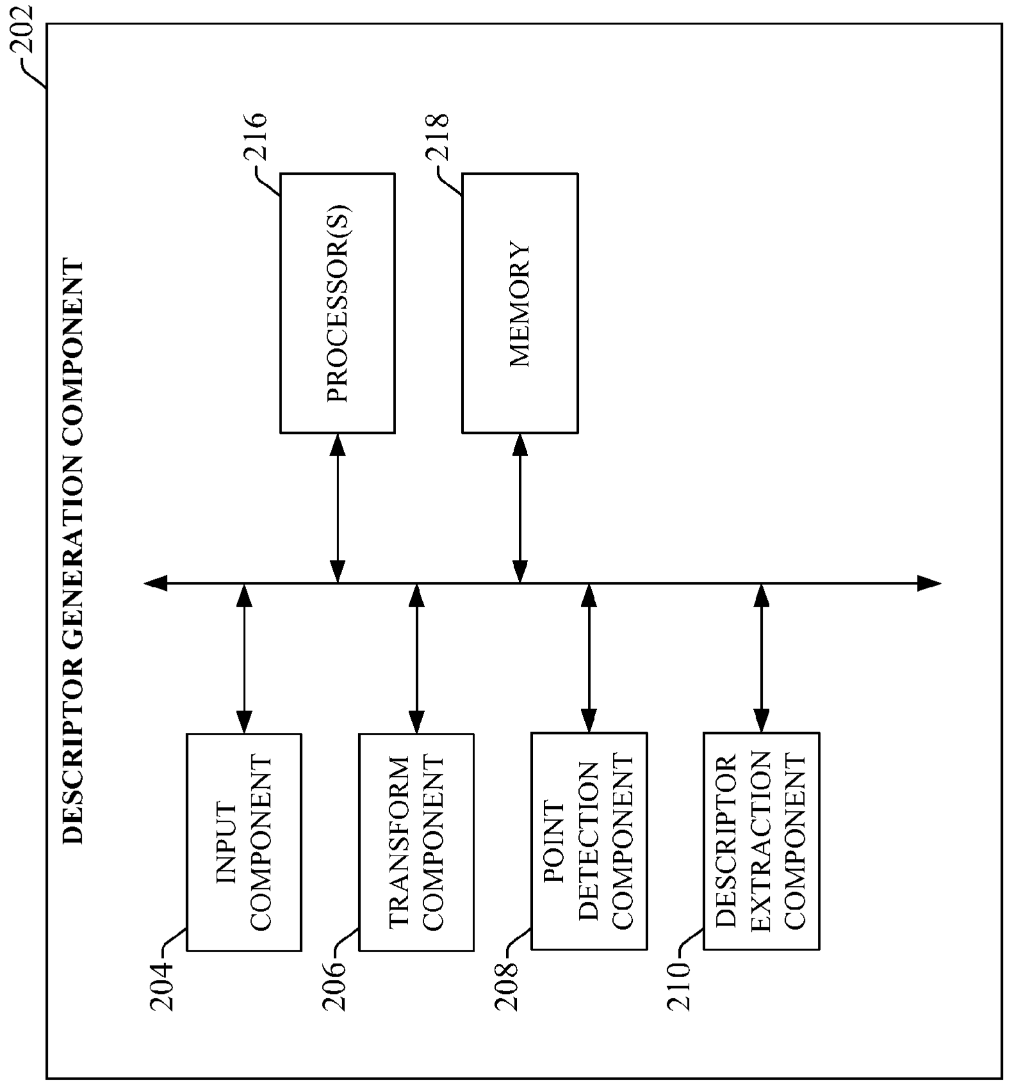
FIG. 2 illustrates a block diagram of an exemplary descriptor generation component.

FIG. 2 is a block diagram of an exemplary non-limiting descriptor generation component. Descriptor generation component 202 can include an input component 204, a transform component 206, a point detection component 208, a descriptor extraction component 210, one or more processors 216, and memory 218. In various embodiments, one or more of the input component 204, transform component 206, point detection component 208, descriptor extraction component 210, processor(s) 216, and memory 218 can be electrically and/or communicatively coupled to one another to perform one or more of the functions of the descriptor generation component 202.

Input component 204 can be configured to receive an audio clip for which a set of descriptors is to be generated. Input component 204 can be configured to accept the audio clip in any suitable format, including, but not limited to, MP3, wave, MIDI, or other such formats (including both digital and analog formats).

Transform component 206 can be configured to transform the audio clip received by input component 204 into a time-frequency representation (similar to time-frequency spectrogram 102 of FIG. 1) to facilitate processing of interest points. In one or more embodiments, transform component 206 can apply a short-time Fourier transform (STFT) to the received audio clip to yield the time-frequency representation. However, other suitable transforms remain within the scope of this disclosure.

Point detection component 208 can be configured to identify interest points within the time-frequency representation of the audio clip. The point detection component 208 can employ any suitable technique for selecting the interest points. In a non-limiting example, point detection component 208 can employ an algorithm that identifies local magnitude peaks in the audio clip's time-frequency spectrogram, and selects these peaks as the interest points (interest points $\mathbf{104}_{1\text{-}N}$ of FIG. 1 are an example of such local peaks). In another example, point detection component 208 can identify points in the time-frequency spectrogram determined to have a relatively high degree of stability even if the audio signal is pitch shifted and/or time stretched, or that are determined to be relatively resistant to noise. In such embodiments, point detection component 208 can, for example, test the received audio signal by applying a controlled amount of pitch shifting and/or time stretching to the audio clip, and identify a set of interest points determined to be relatively invariant to the applied transformations. It is to be appreciated that the techniques disclosed herein do not depend on the particular method for choosing interest points. However, interest point selection preferably seeks to uniquely characterize the audio signal, such that there is little or no overlap between two sets of interest points for respective two different audio clips.

Descriptor extraction component 210 can be configured to generate a descriptor for the received audio clip based on the interest point data provided by the point detection component 208. As will be described in more detail below, descriptor extraction component 210 can employ a number of different techniques for generating the descriptor given the interest point identifications and their associated magnitudes.

As noted above, the magnitude component of an audio signal's time-frequency spectrogram is relatively stable even if the signal is pitch shifted and/or time stretched. However, the absolute value of the magnitude of a given interest point may be susceptible to changes in volume or equalization. For audio clips recorded using a portable recording device, the magnitude component of the resultant recording may also be affected by the proximity of the recording device to the audio source. However, in such scenarios, the relative magnitude between two given points of the audio clip's time-frequency spectrogram may remain relatively stable over a range of volumes or equalization modifications. In order to leverage this stable property of the time-frequency spectrogram, one or more embodiments of descriptor extraction component 210 can generate descriptors based on magnitude comparisons or magnitude ratios between pairs of interest points. By generating descriptors as a function of these magnitude ratios, the resultant descriptors can be rendered more stable and invariant to pitch shifting, time stretching, volume changes, equalization, and/or other such transformations, thereby accurately identifying the audio clip independent of such transformations. Various techniques for creating a descriptor based on relative magnitudes are discussed in more detail below.

Processor(s) 216 can perform one or more of the functions described herein with reference to any of the systems and/or methods disclosed. Memory 218 can be a computer-readable storage medium storing computer-executable instructions and/or information for performing the functions described herein with reference to any of the systems and/or methods disclosed.

Among other applications, the descriptor generation component described above can be used in the context of an audio matching system configured to locate stored audio files matching an input (e.g. probe) audio clip (e.g., an audio clip recorded on a portable device, an audio clip recorded from a radio broadcast, etc.). Before discussing particular techniques for generating audio file descriptors based on relative magnitudes, an exemplary audio matching system 302 that uses the descriptor generation component is described in connection with FIG. 3. Audio matching system 302 can include a descriptor generation component 306, a matching component 310, and an interface component 318. Descriptor generation component 306 can be similar to descriptor generation component 202 of FIG. 2. According to this exemplary system, audio clip 304 is provided as input to descriptor generation component 306 so that a corresponding reference audio file stored in audio repository 312 can be located and/or retrieved. For example, audio clip 304 can be an audio excerpt of a song recorded on a portable recording device, a off-air recording of a radio broadcast, an edited (e.g., equalized, pitch shifted, time stretched, etc.) version of an original recording, or other such audio data. The audio clip 304 can be provided in any suitable signal or file format, such as an MP3 file, a wave file, a MIDI output, or other appropriate format.

Descriptor generation component 306 receives audio clip 304, analyzes the time-frequency spectrogram for the signal, and generates a set of descriptors 308 corresponding to a respective set of local features of the audio clip. Descriptors 308 collectively serve to uniquely identify the audio clip 304. In one or more embodiments, descriptor generation component 306 can generate the descriptors 308 based, at least in part, on magnitudes of interest points or relative magnitudes between interest points of the audio clip's time-frequency spectrogram. Exemplary non-limiting techniques for leveraging these magnitudes and relative magnitudes are discussed in more detail below.

Figure 3:
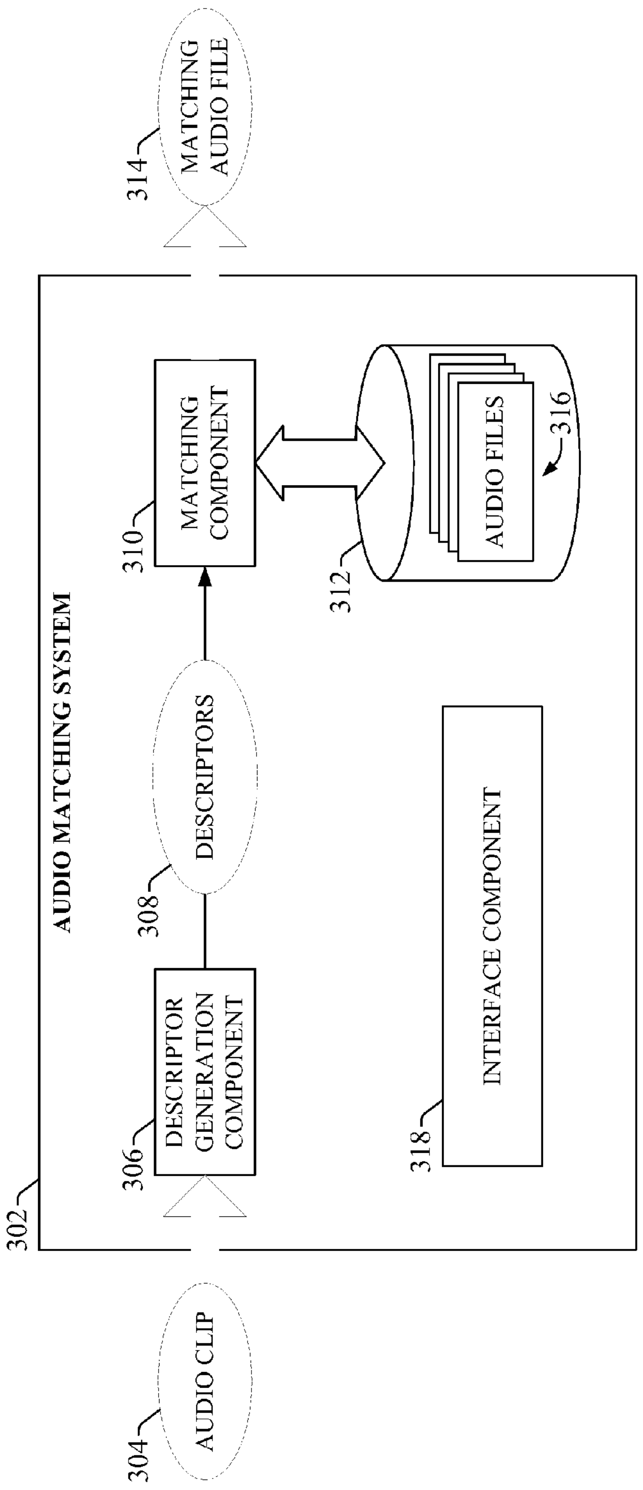
FIG. 3 illustrates a block diagram of an exemplary audio matching system that includes a descriptor generation component.

Descriptors 308 are provided to matching component 310, which uses descriptors 308 as criteria for searching audio repository 312. Audio repository 312 can be any storage architecture capable of maintaining multiple audio files 316 and/or their associated descriptors for search and retrieval. Although audio repository 312 is depicted in FIG. 3 as being integrated within audio matching system 302, audio repository 312 can be located remotely from the audio matching system 302 in some implementations. In such implementations, audio matching system 302 can access audio repository 312 over a public or private network. For example, audio repository 312 can be an Internet-based online audio file library, and audio matching system 302 can act as a client that resides on an Internet-capable device or workstation and accesses the audio repository 312 remotely.

The audio files 316 in audio repository 312 can be stored with their own associated descriptors, which have been calculated for each audio file of audio files 316. Matching component 310 can search the respective descriptors associated with audio files 316 and identify a matching audio file 314 having a set of descriptors that substantially match the set of descriptors 308. Matching component 310 can then retrieve and output this matching audio file 314. Alternatively, instead of outputting the matching audio file 314 itself, matching component 310 can output information relating to the matching audio file for review by the user.

Audio matching system 302 can also include an interface component 318 that facilitates user interaction with the system. Interface component 318 can be used, for example, to direct the audio clip 304 to the system, to initiate a search of audio repository 312, and/or to visibly or audibly render search results.

Figure 4:
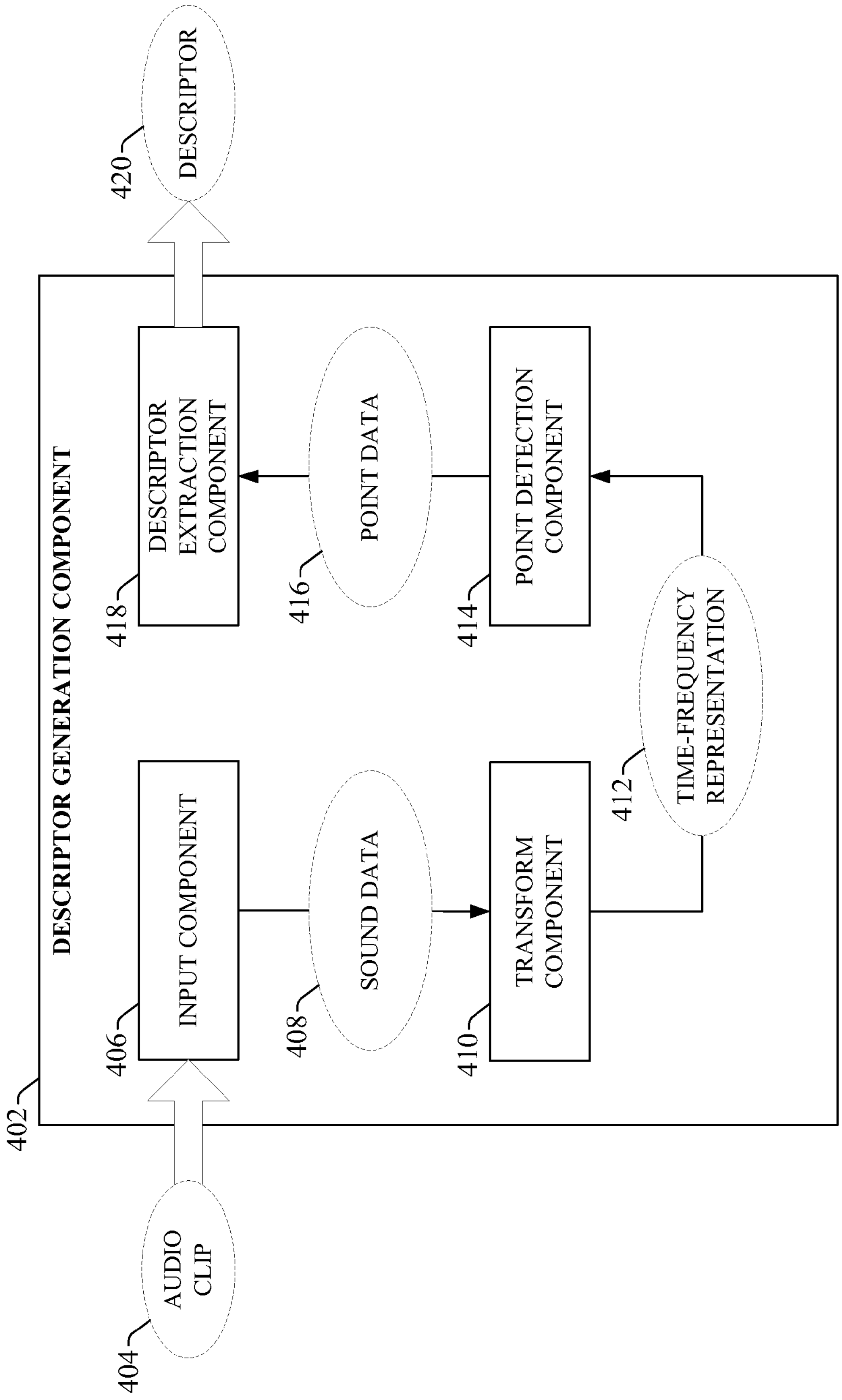
FIG. 4 illustrates a block diagram of an exemplary descriptor generation component that generates a descriptor for an audio sample.

Functional components of the descriptor generation component (e.g., descriptor generation component 306 of FIG. 3) are now described with reference to FIG. 4. Descriptor generation component 402 can include an input component 406, a transform component 410, a point detection component 414, and a descriptor extraction component 418. These components can be similar to those described above in connection with FIG. 2. Audio clip 404 is provided to input component 406, which provides associated sound data 408 to transform component 410. Sound data 408 can be, for example, digitized data representing the content of audio clip 404. For instance, if the audio clip 404 is received as an analog signal, input component 406 may transform this analog signal into digital sound data to facilitate spectrographic analysis. In such embodiments, input component 406 can include a suitable analog-to-digital conversion component (not shown).

Transform component 410 receives the sound data 408 and generates a time-frequency representation 412 of the content of audio clip 404. In some embodiments, transform component 410 can perform a short-time Fourier transform (STFT) on the sound data 408 to yield the time-frequency representation 412. The resultant time-frequency representation 412 can describe the audio clip 404 as a three-dimensional time-frequency spectrogram similar to time-frequency spectrogram 102 of FIG. 1, wherein each point on the spectrogram is described by a time value, a frequency value, and a magnitude value.

The time-frequency representation 412 is provided to point detection component 414, which identifies interest points within the time-frequency representation 412 to be used to generate descriptors. Since the descriptor generation techniques described herein do not depend on the particular choice of interest points, point detection component 414 can employ any suitable selection process to identify the interest points. For example, point detection component 414 can identify a set of points within the time-frequency representation 412 having local peaks in magnitude, and select these points as the interest points. Additionally or alternatively, point detection component 414 can perform various simulations on the time-frequency representation 412 to determine a set of stable points within the time-frequency representation 412 for use as interest points (e.g., points determined to be most resistant to pitch shifting, time stretching, etc.). Once a set of interest points has been identified, point detection component 414 can group the interest points into subsets so that a descriptor can be created for each subset. Any suitable technique for identifying subsets of interest points within an audio clip is within the scope of certain embodiments of this disclosure.

Based on results of the point identification analysis, point detection component 414 can provide point data 416 to descriptor extraction component 418. Point data 416 can include, for example, identifiers for the interest points, magnitude data for the respective interest points, and/or position information for the subsets of interest points for which descriptors are to be created. In one or more embodiments, descriptor extraction component 418 can provide the magnitude data as raw magnitude values associated with the selected interest points. However, it is noted that the magnitude component of the time-frequency representation 412 may be susceptible to equalization and/or dynamic range compression of the source audio clip. To make descriptor generation more resistant to such audio modifications, the point data 416 can include normalized magnitude values, referred to herein as strength values, for the respective interest points. The strength value for a given interest point can be derived by computing a mean magnitude over a time-frequency window centered or substantially centered on the interest point, and dividing the interest point's magnitude by this mean magnitude. In this way, the interest point's magnitude is normalized by its neighborhood, as defined by the time-frequency window. This is only one exemplary technique for normalizing an interest point's magnitude, and it is to be appreciated that other normalization techniques are also within the scope of this disclosure. Normalizing the magnitude values in this manner can render the computed magnitude ratios between the interest points more resistant to equalization and/or dynamic range compression of the original audio clip.

Descriptor extraction component 418 can receive the point data 416 and, based on the point identifications and associated magnitude and/or strength values, generate a descriptor 420 for each subset of interest points identified for the audio clip 404. The descriptor 420 can be used as part of an overall identifier that uniquely identifies the audio clip 404, and is therefore suitable for audio matching applications. For example, descriptors generated for each subset of interest points identified for the audio clip 404 can collectively serve as an identifier for the audio clip 404. Since descriptor generation component 402 generates descriptor 420 based on relative magnitudes or magnitude ratios between interest points of the audio clip's time-frequency representation 412 (as will be discussed in more detail below), the descriptor 420 will be consistent and repeatable even if the audio clip 404 has been pitch shifted and/or time stretched, or if the audio clip 404 includes noise (as might be captured if the source of the audio clip 404 is a portable recording device).

Various techniques for generating the descriptor using interest point magnitudes will now be discussed in connection with FIGS. 5 and 6. In particular, FIG. 5 illustrates generation of audio clip descriptors based on magnitude ordering, and FIG. 6 illustrates descriptor generation based on anchor point comparisons and magnitude ratios.

Figure 5:
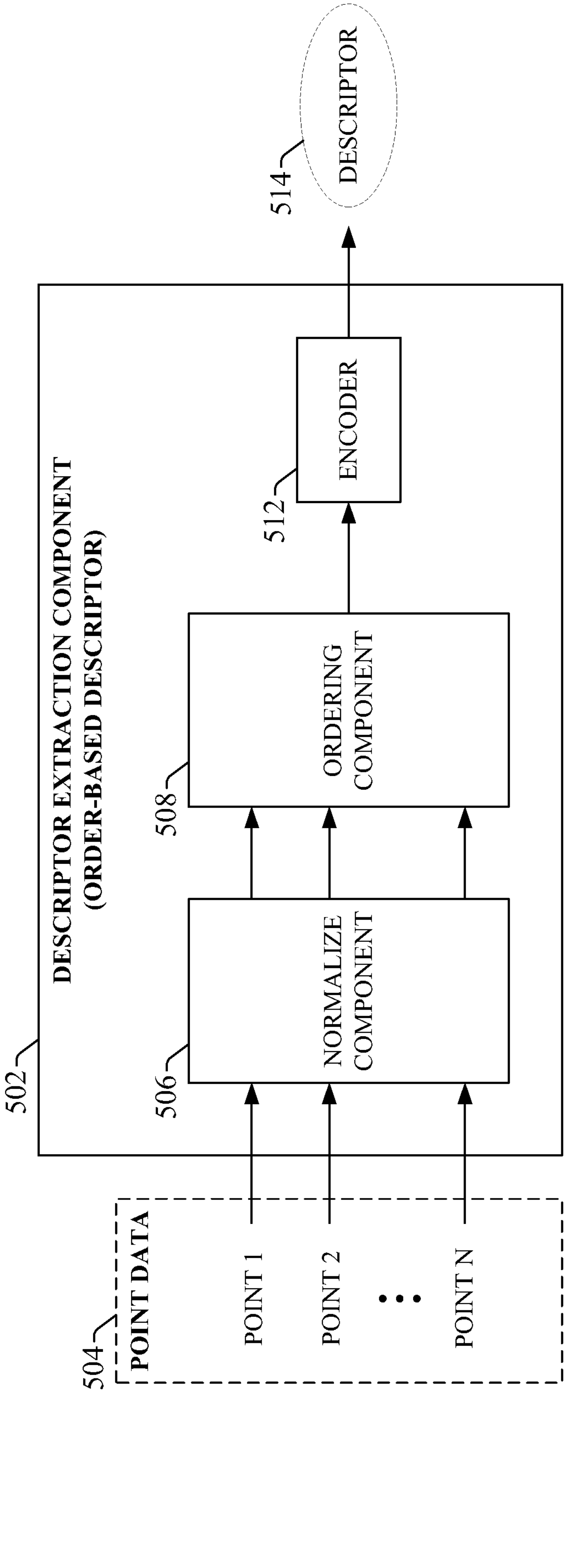
FIG. 5 is a block diagram of an exemplary descriptor extraction component that employs magnitude ordering to generate a descriptor for an audio clip.
Figure 6:
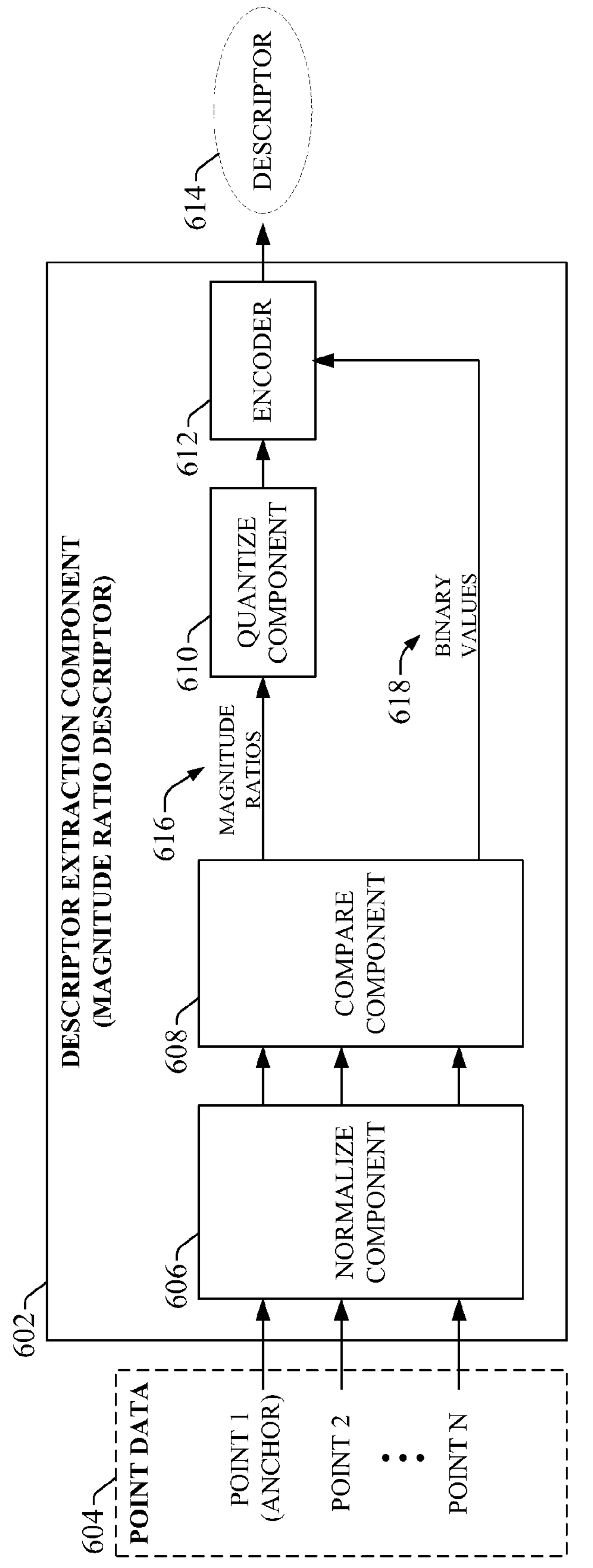
FIG. 6 illustrates an exemplary descriptor extraction component that leverages magnitude ratios to generate a descriptor for an audio clip.

FIG. 5 depicts a block diagram of an exemplary non-limiting descriptor extraction component 502 that employs magnitude ordering to generate a descriptor for an audio clip. Point data 504 represents a subset of interest points for which a descriptor is to be created. Point data 504 can be provided, for example, by the point detection component 414 of FIG. 4, and can include identifiers for the interest points as well as magnitude data associated with the respective interest points. In this example, point data 504 is made up of N interest points, where N is a non-zero integer.

As noted above, descriptors based on relative magnitudes can be made more stable if the magnitudes are normalized by their respective neighborhoods to yield corresponding strength values. Accordingly, descriptor extraction component 502 can include a normalize component 506 configured to normalize raw magnitude values provided by the point data 504 to yield corresponding strength values for the interest points. In one or more embodiments, normalize component 506 can calculate the strength value for each interest point by computing a mean magnitude across a time-frequency window centered or substantially centered at the interest point, and dividing the magnitude of the interest point by this computed mean magnitude. In such embodiments, the normalize component 506 (or the point detection component 414 of FIG. 4) can define a two-dimensional window parallel with the time-frequency plane of the audio clip's time-frequency representation and substantially centered at the interest point to be normalized. The normalize component 506 can then compute the mean magnitude within the window, and divide the magnitude of the interest point being normalized by this mean magnitude to yield the strength value (i.e., the normalized magnitude value) of the interest point. For systems in which the point data 504 already includes the strength values for the respective interest points (e.g., systems in which the point detection component 414 calculates the strength values for the interest points), or for systems that do not use strength values (e.g., systems that do not anticipate equalized audio), the normalize component 506 can be omitted. Alternatively, the descriptor extraction component 502 can generate the descriptor using raw, non-normalized magnitude values. Although the exemplary systems and methods are described in this disclosure in terms of interest point magnitude, it is to be understood that the interest point strength (i.e., normalized magnitude) can also be used, and indeed may yield more consistent results in some scenarios.

Ordering component 508 receives the normalized interest point data and performs comparative analysis on the data. In this order-based example, ordering component 508 compares the relative magnitudes (or strengths) of the N interest points and arranges the interest point identifiers in order of ascending or descending magnitude. For example, consider a scenario in which the number of interest points N=4, and the four interest points (m1, m2, m3, and m4) have the following magnitude values:

$$m1=100$$

$$m2=200$$

$$m3=50$$

$$m4=25$$

Assuming a descending ordering algorithm, ordering component 508 will order the interest points from largest magnitude to smallest magnitude (m2, m1, m3, m4), which yields the following 1×N matrix:

$$[2,1,3,4] \quad (1)$$

where the values in matrix (1) correspond to the interest point identifiers. Ordering component 508 passes this 1×N matrix to encoder 512, which encodes the ordering defined in the matrix in descriptor 514. Descriptor extraction component 502 can then associate descriptor 514 with the subset of interest points represented by point data 504. Descriptor 514 can be combined with descriptors for other subsets of interest points identified for the audio clip to create a unique identifier for the audio clip. Other variations for creating descriptor 514 using magnitude ordering are also within the scope of certain embodiments. For example, the magnitude ordering can be combined with information regarding the position of the interest points within the audio clip to yield descriptor 514.

The ordering-based technique described above can ensure that repeatable, consistent descriptors are generated for a given audio segment even if the segment has been subjected to transformations such as pitch shifting, time stretching, equalization, dynamic range compression, global volume changes, and/or other such distortions, since the relative magnitudes between pairs of points of the segment's time-frequency representation are likely to remain consistent regardless of such audio processing.

FIG. 6 illustrates a block diagram of an exemplary descriptor extraction component that uses magnitude ratios to generate descriptors for an audio clip. As in the order-based example described above in connection with FIG. 5, descriptor extraction component 602 receives point data 604, which is normalized, if necessary, by normalize component 606 (which can be similar to normalize component 506 of FIG. 5). In this example, the point data (or normalized point data) is passed to compare component 608.

In the present example, one of the interest points is selected to serve as an anchor point, which is compared with each of the remaining N−1 interest points. Results of these comparisons are used to generate descriptor 614. This anchor point comparison can yield two types of result data—binary values and magnitude ratios. Descriptor extraction component 602 can encode one or both of these results in descriptor 614, as described in more detail below.

Upon receipt of the normalized interest point data, compare component 608 identifies the point that is to act as the anchor point. In one or more embodiments, the compare component 608 itself can select the anchor point according to any suitable criteria. Alternatively, the anchor point can be pre-selected (e.g., by point detection component 414 of FIG. 4), and interest point data 604 can include an indication of which interest point has been designated as the anchor point. Compare component 608 then compares the magnitude of the anchor point with the magnitude of each of the remaining N−1 interest points in turn. This comparison yields a 1×[N−1] matrix containing N−1 binary values corresponding to the remaining (non-anchor) interest points, where 1 indicates that the magnitude of the anchor is equal to or greater than that of the compared interest point, and 0 indicates that the magnitude of the anchor is less than the compared interest point. For example, given the magnitude values for interest points m1, m2, m3, and m4 specified above in connection with FIG. 4, and designating m1 as the anchor point, compare component 608 will generate the following binary values:

$$m1>m2\rightarrow 0$$

$$m1<m3\rightarrow 1$$

$$m1<m4\rightarrow 1$$

Based on these results, compare component 608 will create the following 1×[N−1] matrix:

$$[0,1,1] \quad (2)$$

Compare component 608 can output these binary values 618 to encoder 612, which can encode the binary values 618 in descriptor 614. Although this example uses a binary comparison standard to generate matrix (2), one or more embodiments of this disclosure may alternatively use a ternary comparison standard. In such embodiments, rather than generating a 1 or a 0 for each comparison, compare component 608 can generate one of three values for each comparison—a first value indicating that the magnitude of the anchor is greater than that of the compared interest point, a second value indicating that the magnitude of the anchor is less than that of the compared interest point, or a third value indicating that the magnitude of the anchor is approximately equal to that of the compared interest point. Although the examples herein are described in terms of binary comparison values, it is to be appreciated that ternary comparison values may also be used and are within the scope of certain embodiments of this disclosure.

In addition to binary values 618, compare component 608 can also compute magnitude ratios 616 between the anchor point and each of the remaining N−1 interest points. For the exemplary interest points m1, m2, m3, and m4, and still using m1 as the anchor point, compare component 608 will compute the following magnitude ratios:

$$m1:m2=|100:200|\rightarrow 2$$

$$m1:m3=|100:50|\rightarrow 2$$

$$m1:m4=|100:25|\rightarrow 4$$

Compare component 608 can then add these magnitude ratios to matrix (2) such that the each magnitude ratio follows its corresponding binary vector, resulting in the following modified matrix:

$$[0,2,1,2,1,4] \quad (3)$$

In one or more embodiments, the magnitude ratios may be quantized prior to being encoded in the descriptor 614. To this end, one or more embodiments of descriptor extraction component 602 can include a quantize component 610 that receives the magnitude ratios 616 and quantizes the ratios into suitably sized bins. For example, given a magnitude ratio of 3.3 residing between quantization bins of 2 and 4, and assuming the quantize component 610 quantizes by rounding down, the magnitude ratio 3.3 will be quantized to a value of 2. The quantization granularity applied by the quantize component 610 can be set as a function of an amount of information the user wishes to extract from a given audio clip.

The magnitude ratios (or quantized magnitude ratios) can be provided to the encoder 612 (e.g., by compare component 608 or quantize component 610). Encoder 612 can then add the magnitude ratios to their corresponding binary values 618, thereby yielding matrix (3) above. Encoder 612 can encode this matrix data in descriptor 614, and descriptor extraction component 602 can associate the descriptor 614 with the subset of interest points represented by point data 604. Since the quantized magnitude ratios are largely invariant to pitch shifting, time stretching, global volume changes, and/or noise, descriptor extraction component 602 can yield a consistent set of descriptors for a given audio clip (e.g., a song) even if the clip has been subjected to such transformations or distortions.

It is to be appreciated that, although descriptor extraction component 602 is depicted as encoding both the magnitude ratios 616 and the binary values 618 in descriptor 614, some embodiments may encode only one of these two quantities in descriptor 614 and remain within the scope of certain embodiments of this disclosure. Moreover, the magnitude ratios 616 and/or the binary values 618 may be combined with other descriptive information for the audio clip to yield descriptor 614. For example, in one or more embodiments, encoder 612 can combine the magnitude ratios 614 (either quantized or non-quantized) and/or the binary values 618 with information regarding the position of the interest points represented by point data 604, and encode this combined information in descriptor 614.

FIGS. 7-11 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 7:
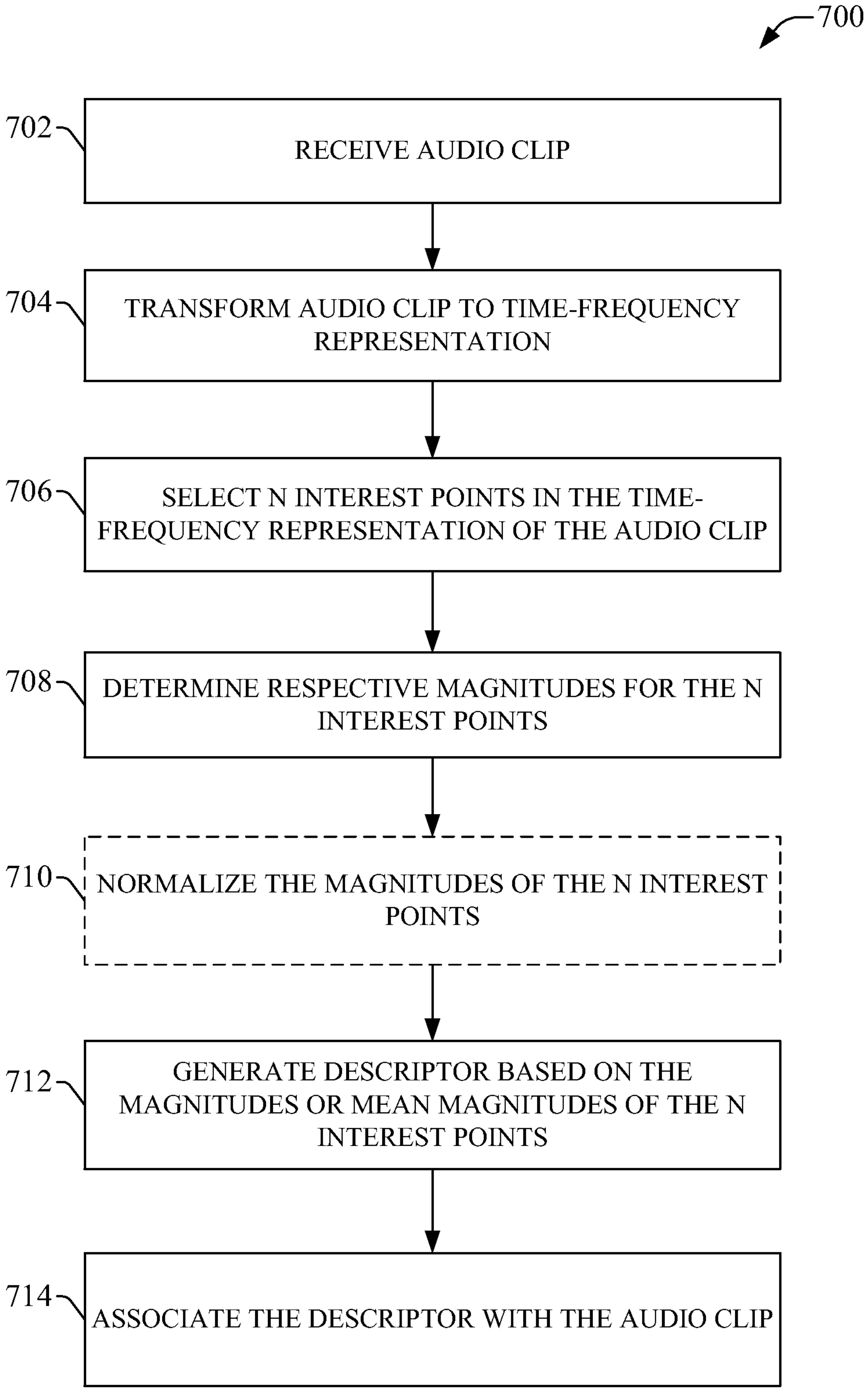
FIG. 7 is a flowchart of an example methodology for generating a descriptor for an audio clip based on audio characteristics of the clip.

FIG. 7 illustrates an example methodology 700 for generating descriptors for an audio clip based on audio characteristics of the clip. At 702, an audio clip is received (e.g., by an input component 406). The audio clip can be recorded content, such as a song, a spoken work recording, or other audio content for which a unique set of descriptors is desired. The audio clip can be received in any suitable audio data format, including, but not limited to, MP3, wave, MIDI, a direct analog signal, or other such digital or analog formats.

At 704, the audio clip is transformed to its time-frequency representation (e.g., by a transform component 410) to facilitate spectrographic point analysis. The time-frequency representation describes the content of the audio clip as a function of the three axes of time, frequency, and magnitude. At 706, N interest points within the time-frequency representation are selected (e.g., by a point detection component 414) for use as a basis for the descriptor. The interest points are points on the time-frequency plane of the time-frequency representation, and each interest point has an associated magnitude dimension. Any suitable selection criteria can be used to select the interest points, including identification of points having local magnitude peaks relative to surrounding points, identification of points determined to be relatively invariant to audio transformations and/or noise, or other suitable selection techniques.

At 708, the magnitudes of the respective N interest points are determined (e.g., by point detection component 414). As an optional step, these magnitudes can be normalized at step 710 (e.g., by a normalize component 506 or a normalize component 606) to yield strength values for the N interest points. In some embodiments, the strength values can be determined by dividing the magnitude of each of the N interest points by respective mean magnitudes of time-frequency windows centered or substantially centered at the respective N interest points. Results of these division operations represent strength values for the respective N interest points. Using the strength values (rather than the raw magnitude values) to calculate the descriptor may yield more consistent results in some cases, since the strength value may be more invariant to equalization and/or dynamic range compression than the raw magnitude values. The remaining steps of methodology 700 may be carried out using either the magnitude values or the strength values.

At 712, a descriptor is generated (e.g., by an encoder 512 or an encoder 612) based on the magnitude values or the strength values of the N interest points. At 714, the resultant descriptor is associated with the audio clip received at step 702 (e.g., by a descriptor extraction component 502 or a descriptor extraction component 602). The descriptor, together with other descriptors generated for other sets of interest points selected for the audio clip, can be used to uniquely identify the audio clip, and is therefore suitable for use in audio matching systems or other applications requiring discrimination of audio files. In certain embodiments, the magnitude-based descriptor can also be added to other descriptive information associated with the audio clip, such as information regarding interest point positions, to yield an identifier for the audio clip.

Figure 8:
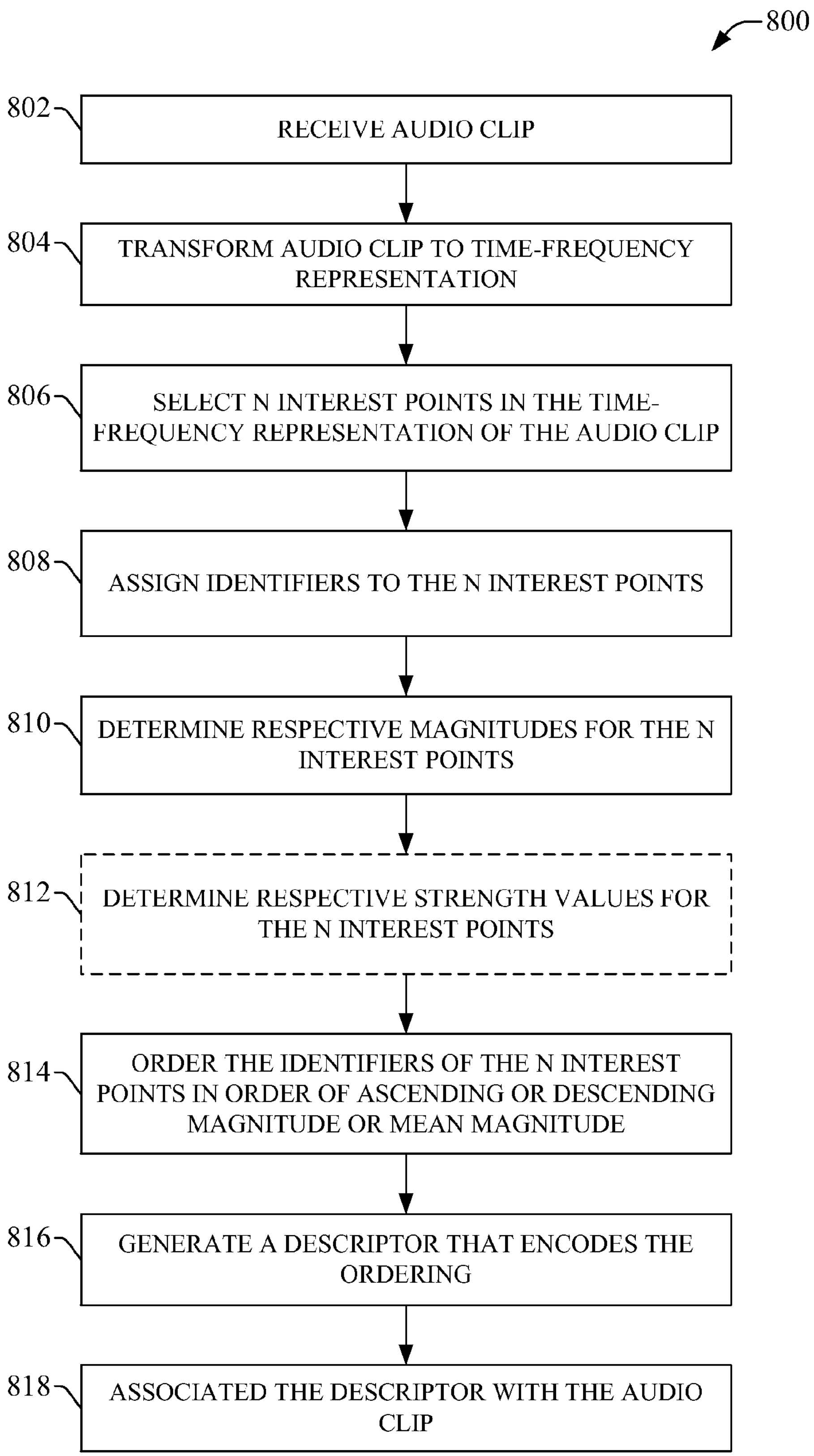
FIG. 8 is a flowchart of an example methodology for generating a descriptor for an audio clip using magnitude ordering.

FIG. 8 illustrates an example methodology 800 for generating a descriptor for an audio clip using magnitude ordering. At 802, an audio clip is received (e.g., by an input component 406). At 804 the audio clip is transformed to its time-frequency representation (e.g., by a transform component 410). At 806, N interest points in the time-frequency representation are selected (e.g., by a point detection component 414). Steps 802-806 can be similar to steps 702-706 of the methodology of FIG. 7.

At 808, identifiers are respectively assigned to the N interest points (e.g., by point detection component 414). At 810, the magnitudes of the respective N interest points are determined (e.g., by point detection component 414). Optionally, at 812, strength values for the respective N interest points can be determined (e.g., by a normalize component 506) by dividing the magnitudes of the N interest points by respective mean magnitudes calculated for time-frequency windows centered or substantially centered at the respective N interest points. The remaining steps of methodology 800 can be performed using either the magnitude values determined at step 810 or the strength values determined at step 812.

At 814, the identifiers associated with the N interest points are ordered (e.g., by an ordering component 508) according to either ascending or descending magnitude. At 816, the ordering determined at step 814 is encoded in a descriptor (e.g., by an encoder 512). At 818, the descriptor is associated with the audio clip (e.g., by a descriptor extraction component 502).

Figure 9:
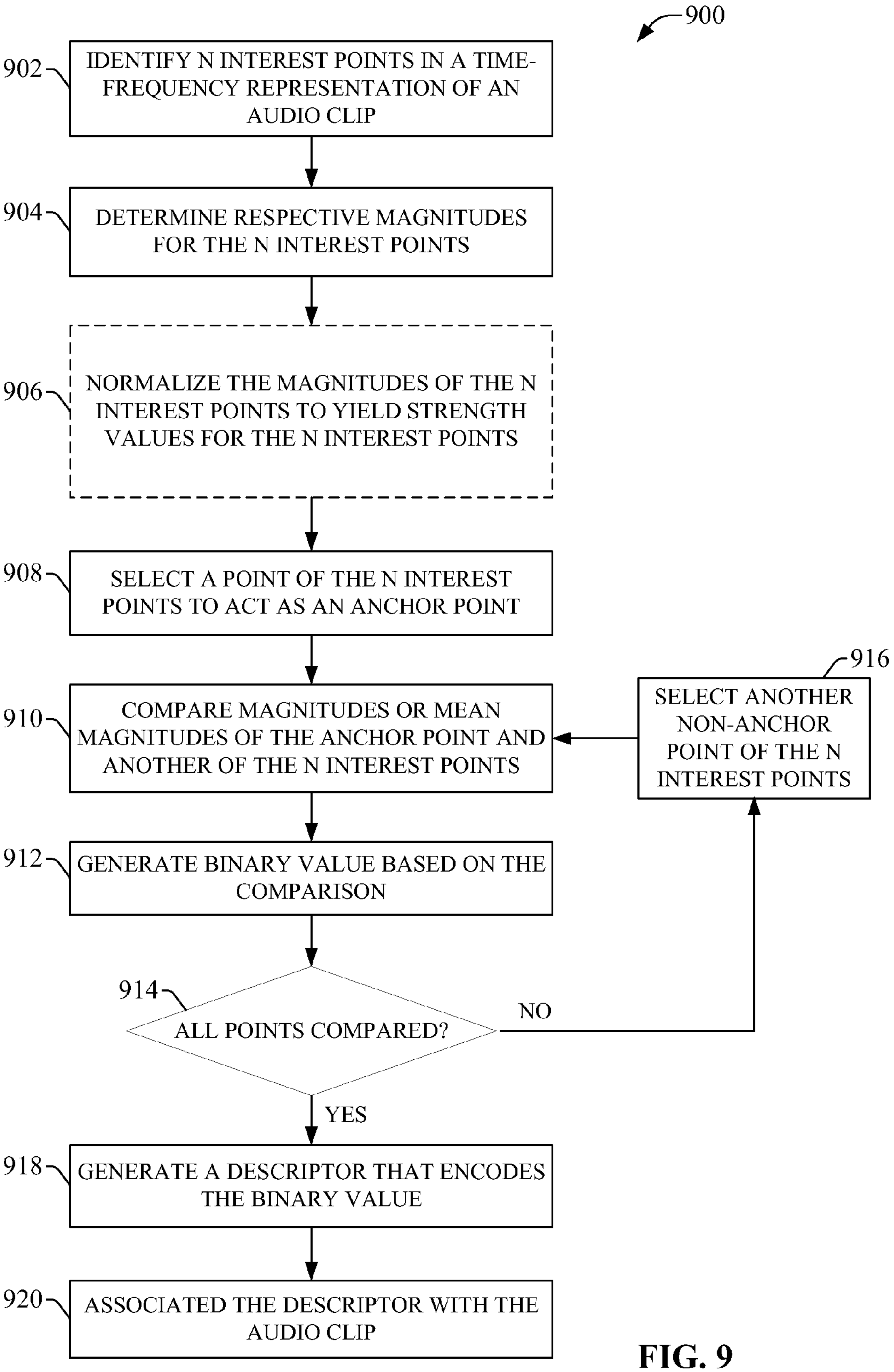
FIG. 9 is a flowchart of an example methodology for generating a descriptor for an audio clip using magnitude comparison.

FIG. 9 illustrates an example methodology 900 for generating a descriptor for an audio clip using magnitude comparison. At 902, N interest points of a time-frequency representation of an audio clip are selected (e.g., by a point detection component 414). At 904, the magnitudes associated with the respective N interest points are determined (e.g., by point detection component 414). At 906, the strength values are optionally calculated for each of the N interest points (e.g., by a normalize component 606). The remaining steps of methodology 900 can be performed using either the magnitude values determined at step 904 or the strength values calculated at 906.

At 908, one of the N interest points is selected (e.g., by point detection component 414 or by a compare component 608) to act as an anchor point. This anchor point will be used as a basis for comparison with the remaining N−1 interest points. At 910, the magnitude (or strength) of the anchor point is compared with the magnitude of another of the N interest points (e.g., by compare component 608). At 912, a binary value is generated (e.g., by compare component 608) based on a result of the comparison. For example, if the comparison at step 910 determines that the magnitude of the anchor point is equal to or greater than the magnitude of the interest point being compared, the binary value may be set to 1. Otherwise, if the magnitude of the anchor point is less than that of the interest point being compared, the binary value can be set to 0. The polarity of this binary standard can be reversed and remain within the scope of certain embodiments of this disclosure.

At 914, it is determined (e.g., by compare component 608) whether all of the remaining N−1 interest points have been compared with the anchor point. If all points have not been compared, the methodology moves to step 916, where another of the N−1 non-anchor interest points is selected (e.g., by compare component 608). The comparison of step 910 and binary value generation of step 912 are repeated for the interest point selected at step 916. This sequence continues until binary values have been generated for all N−1 non-anchor interest points.

If it is determined at step 914 that all N−1 points have been compared with the anchor point, the methodology moves to step 918, where a descriptor is generated (e.g., by encoder 612) that encodes the binary values generated by steps 910-916. At 920, the descriptor is associated with the audio clip from which the interest points were derived at step 902 (e.g., by descriptor extraction component 602).

Figure 10:
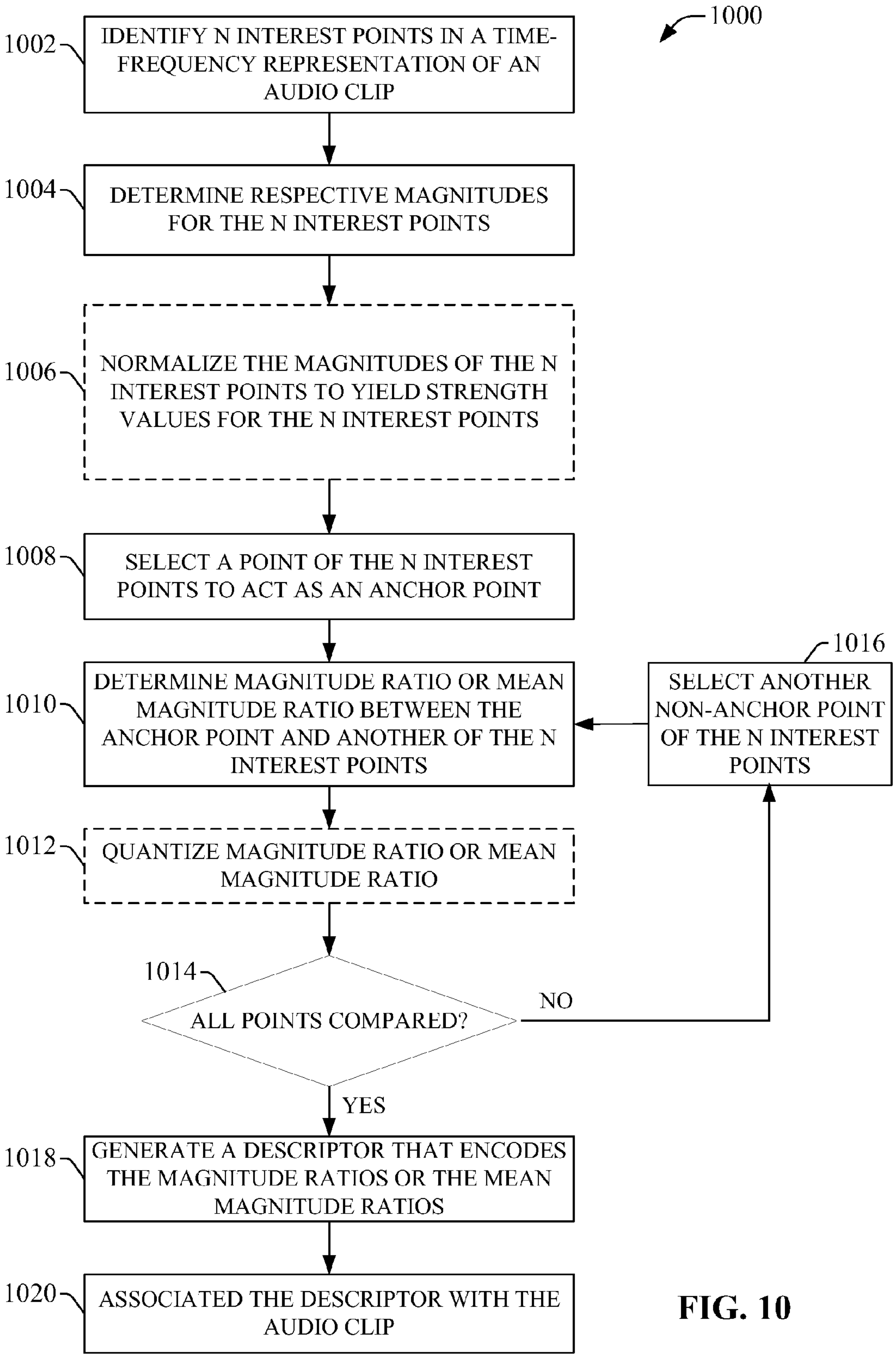
FIG. 10 is a flowchart of an example methodology for generating a descriptor for an audio clip using magnitude ratios.

FIG. 10 illustrates an exemplary methodology 1000 for generating a descriptor for an audio clip using magnitude ratios. At 1002, N interest points are identified (e.g., by a point detection component 414) in a time-frequency representation of an audio clip. At 1004, the magnitudes of the respective N interest points are determined (e.g., by point detection component 414). Optionally, at 1006, the strength values are calculated (e.g., by a normalize component 606) for each of the N interest points according to techniques similar to those discussed above. The remaining steps of methodology 1000 can be performed using either the magnitude values determined at 1004 or the strength values determined at 1006.

At 1008, one of the interest points is selected (e.g., by a compare component 608 or by point detection component 414) to act as an anchor point. At 1010, the ratio between the magnitude of the anchor point and the magnitude of one of the remaining N−1 interest points is determined (e.g., by compare component 608) (alternatively, the ratio of the mean magnitudes, or strengths, obtained at step 1006 can be determined). As an optional step, the magnitude ratio determined at step 1010 is quantized (e.g., by a quantize component 610) at step 1012. The magnitude ratio can be quantized into suitably sized bins, where the granularity of quantization is selected in accordance with an amount of information to be extracted from the characteristics of the audio clip.

At 1014, a determination is made (e.g., by compare component 608) regarding whether all of the N−1 non-anchor interest points have been compared with the anchor point. If it is determined that not all remaining points have been compared, the methodology moves to step 1016, where another of the N−1 non-anchor interest points is selected (e.g., by compare component 608). Steps 1010-1016 are repeated until magnitude ratios (or quantized magnitude ratios) have been determined for all N−1 of the non-anchor interest points relative to the anchor point.

If it is determined at 1014 that all N−1 non-anchor points have been compared with the anchor point, the methodology moves to step 1018, where a descriptor is generated (e.g., by encoder 612) that encodes the magnitude ratios (or quantized magnitude ratios). At 1020, the resultant descriptor 1020 is associated (e.g., by descriptor generation component 602) with the audio clip from which the interest points were extracted.

Figure 11:
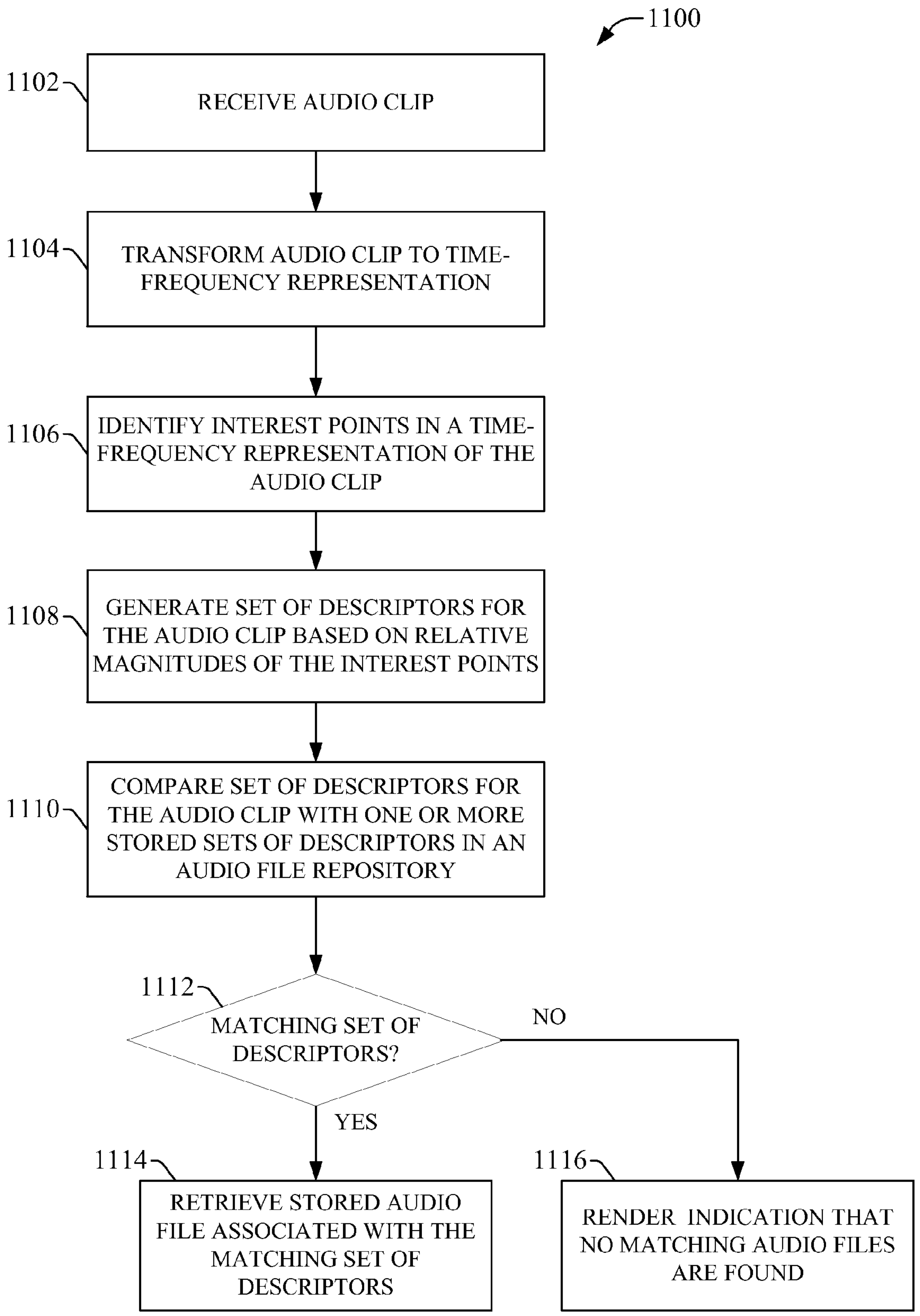
FIG. 11 is a flowchart of an example methodology for matching audio files using pitch-resistant descriptors.

FIG. 11 illustrates an exemplary methodology for matching audio files using pitch-resistant descriptors. At 1102, an audio clip is received (e.g., by an input component 406). The audio clip can be a recorded excerpt of audio content submitted by a user so that a corresponding version of the audio content can be located within a repository of stored audio files. In some scenarios, the audio clip may be a second-hand recording of a song recorded using a portable recording device in proximity of a speaker, an off-air recording of a radio broadcast, or other such audio clips.

At 1104, the audio clip is transformed (e.g., by a transform component 410) to a time-frequency representation. At 1106, interest points are identified (e.g., by a point detection component 414) within the time-frequency representation, as described in previous examples. At 1108, a set of descriptors for the audio clip is generated (e.g., by a descriptor extraction component 418) based on relative magnitudes of selected interest points. The descriptors can be generated based on one or more of an ordering of the interest points according to ascending or descending magnitude, a binary magnitude comparison between pairs of interest points, and/or magnitude ratios between pairs of interest points, as described in previous examples.

At 1110, the set of descriptors generated for the audio clip at 1108 is compared (e.g., by a matching component 310) with one or more stored sets of descriptors in an audio file repository. In one or more embodiments, the stored sets of descriptors are generated for each audio file in the repository prior to storage using a similar methodology used in step 1108 to generate the set of descriptors for the audio clip. The sets of descriptors are then stored in the repository with their associated audio files.

At 1112, it is determined (e.g., by matching component 310) whether a stored set of descriptors matches the descriptor for the audio clip generated at 1108. If a matching set of descriptors is found in the repository, the stored audio file (or information associated therewith) corresponding to the matching set of descriptors is retrieved (e.g., by matching component 310) at 1114. Alternatively, if no matching set of descriptors is found in the repository, an indication is rendered informing that no matching audio files are found in the repository.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
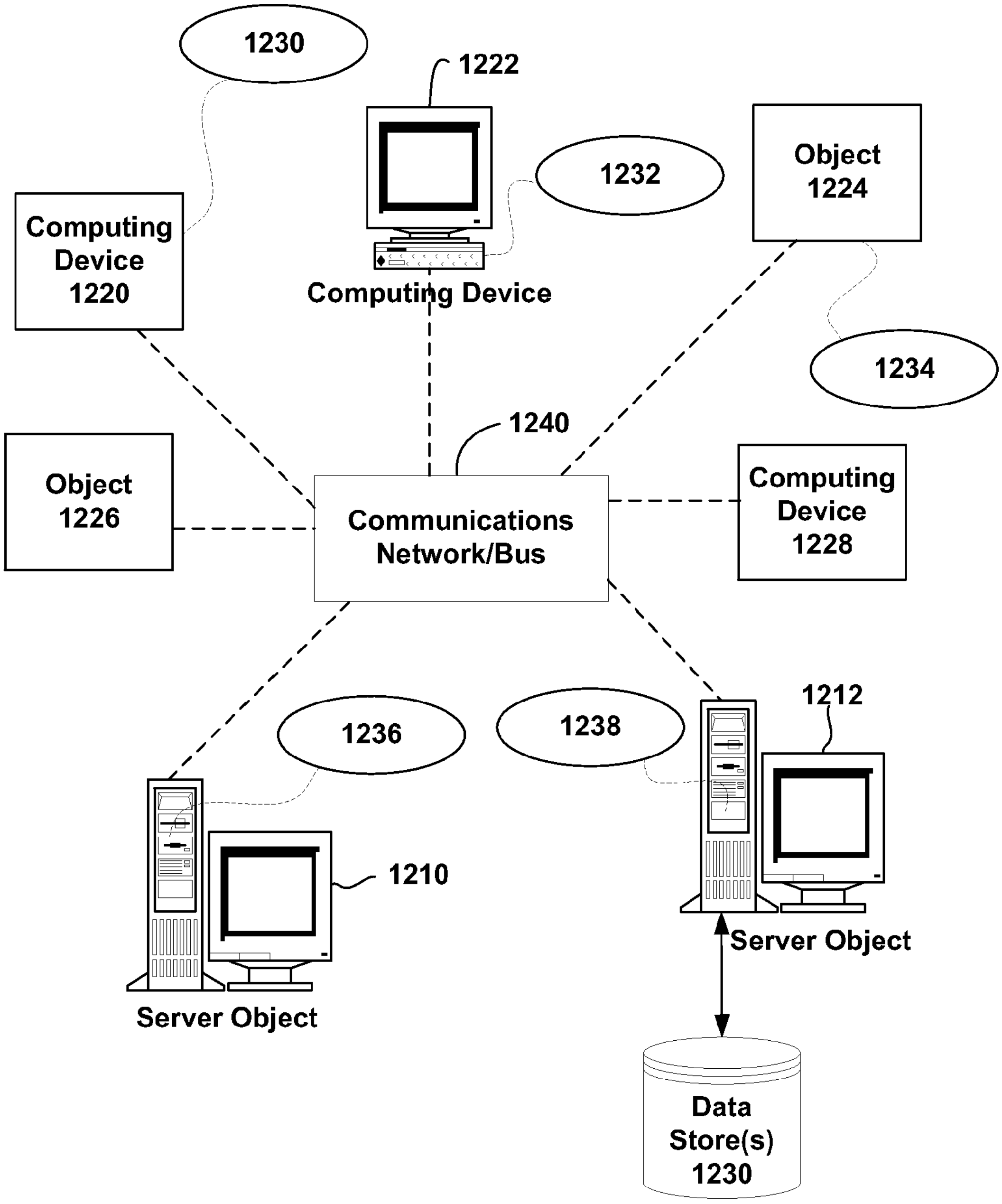
FIG. 12 is a block diagram representing an exemplary networked or distributed computing environment for implementing one or more embodiments described herein.

FIG. 12 provides a schematic diagram of an exemplary networked or distributed computing environment. The distributed computing environment is made up of computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may be different devices, such as personal digital assistants (PDAs), audio/video devices, mobile phones, MP3 players, personal computers, laptops, tablets, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may include other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be used. The "client" is a member of a class or group that uses the services of another class or group. A client can be a computer process, e.g., roughly a set of instructions or tasks, that requests a service provided by another program or process. A client process may use the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects used in connection with the techniques described herein can be provided standalone, or distributed across multiple computing devices or objects.

In a network environment in which the communications network 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

Figure 13:
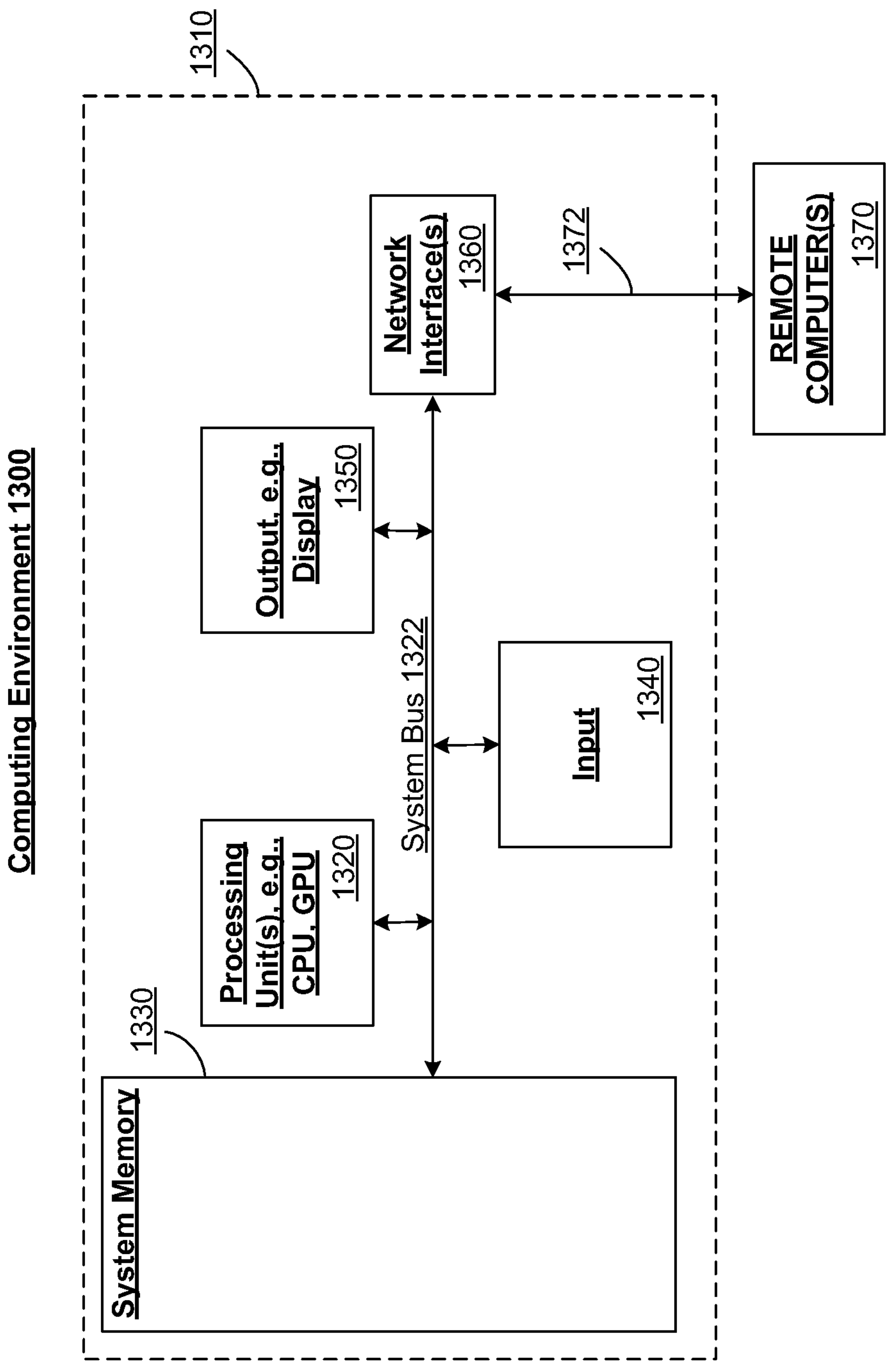
FIG. 13 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 13 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing system environment 1300 be interpreted as having any dependency or requirement relating to any one or combination of components illustrated in the exemplary computing system environment 1300.

With reference to FIG. 13, an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

To provide for or aid in the numerous inferences described herein, components described herein can examine the entirety or a subset of the data available and can provide for reasoning about or infer states of an audio sample, a system, environment, and/or a client device from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the certain aspects of this disclosure.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is used to develop models of priority.

In view of the exemplary systems described above, methodologies that may be implemented in accordance with the this disclosure will be better appreciated with reference to the flowcharts of the various figures. While for purposes of simplicity of explanation, the methodologies are shown and described as a series of blocks, it is to be understood and appreciated that this disclosure is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:

identifying, by a system including one or more processors, a set of interest points in a time-frequency representation of an audio signal;

grouping, by the system, interest points of the set of interest point into subsets, wherein each subset comprises a plurality of interest points;

determining, by the system, respective magnitudes of the interest points in the subsets; and determining, by the system, respective first descriptors for the subsets for the audio signal comprising, for each subset:

for each interest point in the subset:

determining a mean magnitude across a time-frequency window centered at the interest point, and dividing a magnitude of the interest point by the mean magnitude to yield a strength value for the interest point;

ordering the respective strength values of interest points in the subset as a function of size to yield a magnitude ordering of the interest points in the subset;

encoding the magnitude ordering into a first descriptor associated with the subset;

quantizing the strength values of interest points in the subset to yield quantized strength values; and encoding the quantized strength values associated with the subset into the first descriptor associated with the subset.

2. The method of claim 1, further comprising:

comparing the first descriptors to a plurality of second descriptors associated with reference audio signals in an audio repository; and identifying a matching reference audio signal from the audio repository corresponding to the audio signal based on identification of one or more second descriptors, associated with the matching reference audio signal, that match one or more first descriptors.

3. The method of claim 1, wherein the determining the respective first descriptors further comprises, for each subset:

designating an interest point of the subset as an anchor point of the subset;

comparing a magnitude of the anchor point with respective magnitudes of other interest points of the subset using a binary or a ternary comparison to yield respective comparison values of the other interest points; and encoding the comparison values associated with the subset into the first descriptor associated with the subset.

4. The method of claim 1, wherein the determining the respective first descriptors further comprises, for each subset:

designating an interest point of the subset as an anchor point of the subset;

comparing a strength value of the anchor point with respective strength values of other interest points of the subset using a binary or a ternary comparison to yield respective comparison values of the other interest points; and encoding the comparison values associated with the subset into the first descriptor associated with the subset.

5. The method of claim 3, wherein the encoding further comprises:

determining respective magnitude ratios between the magnitude of the anchor point of the subset and the magnitudes of the other interest points of the subset; and encoding the magnitude ratios associated with the subset into the first descriptor associated with the subset.

6. The method of claim 5, wherein the encoding the magnitude ratios further comprises:

quantizing the magnitude ratios associated with the subset to yield quantized magnitude ratios; and encoding the quantized magnitude ratios associated with the subset, instead of the magnitude ratios associated with the subset, into the first descriptor associated with the subset.

7. The method of claim 4, wherein the encoding further comprises:

determining respective strength value ratios between the strength value of the anchor point and the strength values of the other interest points; and encoding the strength value ratios associated with the subset into the first descriptor associated with the subset.

8. A system, comprising:

a memory; and a processor that executes the following computer-executable components stored within the memory:

an identification component configured to:

identify a set of interest points in a time-frequency representation of an audio file, grouping interest points of the set of interest point into subsets, wherein each subset comprises a plurality of interest points, and determine respective magnitudes of the interest points in the subsets; and a descriptor component configured to, for each subset:

for each interest point in the subsets:

determine a mean magnitude of a time-frequency window centered at the interest point, and divide a magnitude of the interest point by the mean magnitude to yield a strength value for the interest point;

order the respective strength values of interest points in the subset as a function of size to yield a magnitude ordering of the interest points in the subset;

create a first descriptor associated with the subset for the audio file indicating the magnitude ordering of the interest points in the subset;

quantize the strength values of interest points in a subset to yield quantized strength values; and encode the quantized strength values associated with the subset into the first descriptor associated with the subset.

9. The system of claim 8, further comprising a search component configured to identify a matching reference audio file, from a repository of reference audio files, having at least one second descriptor that is substantially similar to at least one first descriptor.

10. The system of claim 8, wherein the descriptor component is further configured to, for each subset:

designate an interest point of the subset as an anchor point of the subset;

compare a magnitude of the anchor point with respective magnitudes of other interest points of the subset using a binary or a ternary comparison to yield respective comparison values of the other interest points; and encode the comparison values associated with the subset into the first descriptor associated with the subset.

11. The system of claim 8, wherein the descriptor component is further configured to, for each subset:

designate an interest point of the subset as an anchor point of the subset;

compare a strength value of the anchor point with respective strength values of other interest points of the subset using a binary or a ternary comparison to yield respective comparison values of the other interest points; and encode the comparison values associated with the subset into the first descriptor associated with the subset.

12. The system of claim 10, wherein the descriptor component is further configured to, for each subset:

determine respective magnitude ratios between the magnitude of the anchor point of the subset and the magnitudes of the other interest points of the subset; and encoding the magnitude ratios associated with the subset into the first descriptor associated with the subset.

13. The system of claim 12, wherein the descriptor component is further configured to, for each subset:

quantize the magnitude ratios associated with the subset to yield quantized magnitude ratios; and encode the quantized magnitude ratios associated with the subset, instead of the magnitude ratios, into the first descriptor associated with the subset.

14. The system of claim 11, wherein the descriptor component is further configured to, for each subset:

determine respective strength value ratios between the strength value of the anchor point of the subset and the strength values of the other interest points of the subset; and encode the strength value ratios associated with the subset into the first descriptor associated with the subset.

15. A non-transitory computer-readable medium having instructions stored thereon that, in response to execution, cause a system including a processor to perform operations, comprising:

determining a set of interest points in a time-frequency representation of an audio clip;

grouping interest points of the set of interest point into subsets, wherein each subset comprises a plurality of interest points;

determining respective magnitudes of the interest points in the subsets; and generating respective first descriptors for the audio clip comprising, for each subset:

for each interest point in the subset:

determining a mean magnitude across a time-frequency window centered at the interest point, and dividing a magnitude of the interest point by the mean magnitude to yield a strength value for the interest point;

ordering the respective strength values of interest points in the subset as a function of size to yield a magnitude ordering of the interest points in the subset;

encoding the magnitude ordering into a first descriptor associated with the subset;

quantizing the strength values of interest points in the subset to yield quantized strength values; and encoding the quantized strength values associated with the subset into the first descriptor associated with the subset.

16. The non-transitory computer-readable medium of claim 15, the operations further comprising:

searching a set of reference audio clips using the one or more first descriptors as a search criterion; and identifying a matching reference audio clip, of the set of reference audio clips, having an associated one or more second descriptors that substantially match one or more first descriptors.

17. The method of claim 7, wherein the encoding the strength value ratios further comprises, for each subset:

quantizing the strength value ratios associated with the subset, to yield quantized strength value ratios; and encoding the quantized strength value ratios associated with the subset, instead of the strength value ratios associated with the subset, into the first descriptor associated with the subset.

18. The system of claim 14, wherein the descriptor component is further configured to, for each subset:

quantize the strength value ratios associated with the subset to yield quantized strength value ratios; and encode the quantized strength value ratios associated with the subset, instead of the strength value ratios associated with the subset, into the first descriptor associated with the subset.

* * * * *